US012747624B2

(12) United States Patent
Krause

(10) Patent No.: US 12,747,624 B2
(45) Date of Patent: Sep. 29, 2026

(54) METHOD OF INSTALLING A WINDOW AND COMPOSITE WINDOW BRACKET

(71) Applicant: G. Matt Krause, Allegan, MI (US)

(72) Inventor: G. Matt Krause, Allegan, MI (US)

(*) Notice: Subject to any disclaimer, the term of this patent is extended or adjusted under 35 U.S.C. 154(b) by 24 days.

(21) Appl. No.: 18/789,748

(22) Filed: Jul. 31, 2024

(65) Prior Publication Data

US 2024/0384589 A1 Nov. 21, 2024

Related U.S. Application Data

(63) Continuation of application No. 17/576,802, filed on Jan. 14, 2022, now Pat. No. 12,078,007.

(60) Provisional application No. 63/137,642, filed on Jan. 14, 2021.

(51) Int. Cl.
*F16M 11/00* (2006.01)
*E06B 1/60* (2006.01)

(52) U.S. Cl.
CPC .................................. *E06B 1/6015* (2013.01)

(58) Field of Classification Search
CPC ........ E06B 1/6015; E06B 1/6023; E06B 1/26; E06B 3/5436; E06B 3/5454; E06B 5/164; E06B 3/02
See application file for complete search history.

(56) References Cited

U.S. PATENT DOCUMENTS 6,789,369 B1 * 9/2004 Hughes ..................... E06B 1/26 52/847
2004/0221524 A1 * 11/2004 Poddany ................. F24S 25/60 52/204.5
2019/0211611 A1 * 7/2019 Hay, III ..................... E06B 9/02
2021/0404241 A1 * 12/2021 Hay, III .................. E06B 3/365
2022/0145692 A1 * 5/2022 Franson ..................... E06B 5/11

* cited by examiner

*Primary Examiner* — Amy J. Sterling

(74) *Attorney, Agent, or Firm* — The Watson IP Group, PLC; Jovan N. Jovanovic

(57) ABSTRACT

A method of installing a window and composite window bracket comprises a first member and a second member, and an at least one accessory member to couple the composite window bracket to at least one accessory bracket. The first member includes a first surface extending from a first end of the first member to a second end of the first member, and a second surface extending from the first end first member to the second end first member, the first surface of the first member to be coupled to a support beam. The second member supports a window disposed on the first surface of the second member.

20 Claims, 6 Drawing Sheets

METHOD OF INSTALLING A WINDOW AND COMPOSITE WINDOW BRACKET

CROSS-REFERENCE TO RELATED APPLICATION

The present application is a continuation of U.S. patent application Ser. No. 17/576,802 filed on Jan. 14, 2022, entitled "METHOD OF INSTALLING A WINDOW AND COMPOSITE WINDOW BRACKET", which claims priority from U.S. Provisional Patent Application Ser. No. 63/137,642 filed on Jan. 14, 2021, entitled "COMPOSITE WINDOW BRACKET", the entire specification of which is hereby incorporated by reference in its entirety.

BACKGROUND OF THE DISCLOSURE

1. Field of the Disclosure

The disclosure relates in general to a window bracket, and more particularly, to a composite window bracket.

2. Background Art

In the past, in order to provide a highly thermally efficient (metal) wall or (metal) roof assembly for a building enclosure, it has been necessary for metal materials, typically an exterior and interior metal skin, to be bonded to either side of an insulated panel core inside a factory thereby creating a foam panel. These metal skins are typically profiled and have offsets in them to prevent the exterior metal skin from contacting the interior metal skin. This is done in an effort to prevent metal to metal contact thereby reducing thermal conductivity from the outside of the building. Heat travels in the path of least resistance such that heat can invade a system and affect an interior atmosphere through relatively finite pathways such as fasteners and the like that have metal to metal contact with exterior conditions. Similarly, exterior exposure to cold temperatures can allow for infusion of cold temperatures into a wall construction along highly thermally conductive components.

Most applications of metal roof and wall assemblies retain at least some form of metal to metal contact through metal anchors, fasteners, or sill, transition, and window trim. Products of this type are subject to shorter warranties and life cycles due to the fact that the product is glued or otherwise bonded and is subject to damage and shortened life spans from thermal cycling which causes varying rates of contraction and expansion of the different materials and therefore wears significantly on any given system. Furthermore, these systems often require dissimilar materials to be in contact with each other which can lead to reactions such as oxidation which can corrode these materials over time. A metal wall, roof or deck system that creates a thermal break in the heat conductivity path thereby effectively eliminating or greatly reducing thermal bridging from exterior conditions to interior conditions that keeps like materials separate is desired.

SUMMARY OF THE DISCLOSURE

The disclosure is directed to a composite window bracket comprising a first member and a second member. The first member includes a first end, a second end, a first surface extending from the first end of the first member to the second end of the first member, and a second surface extending from the first end of the first member to the second end of the first member, the first surface of the first member to be coupled to a support beam. The second member includes a first end, a second end, a first surface extending from the first end of the second member to the second end of the second member, and a second surface extending from the first end of the second member to the second end of the second member, the second member to support a window disposed on the first surface of the second member. The at least one of the first member and the second member further includes at least one accessory member to couple the composite window bracket to at least one accessory bracket.

In at least one configuration of the composite window bracket, the composite window bracket is comprised of resin and fibers.

In at least one configuration of the composite window bracket, the fibers comprise at least one of glass fibers, carbon fibers, cellulose fibers, nylon fibers, and aramid fibers.

In at least one configuration of the composite window bracket, the composite window bracket is a pultruded composite window bracket.

In at least one configuration of the composite window bracket, the accessory member is coupled to the second surface of the first member, the accessory member being disposed substantially equidistant between the first end and the second end of the first member, the accessory bracket being coupled to the accessory member to couple the composite window bracket to the support beam.

In at least one configuration of the composite window bracket, the accessory member is coupled to the second surface of the second member, the accessory member being disposed substantially equidistant between the first end and the second end of the second member, the accessory bracket being coupled to the accessory member to provide further support for the window.

In at least one configuration of the composite window bracket, the accessory member is a first accessory member, the composite window bracket further including a second accessory member substantially of a same configuration of the first accessory member and coupled to the second surface of the first member.

In at least one configuration of the composite window bracket, the accessory member is coupled to the first end of the second member.

In at least one configuration of the composite window bracket, the accessory member forms a slot between the accessory member and the second member, the slot including a substantially planar back surface that is substantially perpendicular to the second surface of the second member and including angled ends such that the slot tapers from the back surface to an opening of the slot, the slot to couple the composite window bracket to the at least one accessory bracket.

In at least one configuration of the composite window bracket, the at least one accessory bracket includes a tab, the tab including a substantially flat surface that runs parallel to the second side of the second member, the tab including angled ends that taper towards the first side of the accessory bracket, the angled ends corresponding to the angled ends of the slot of the composite window bracket.

In at least one configuration of the composite window bracket, the at least one accessory bracket includes an intumescent material.

In at least one configuration of the composite window bracket, the at least one accessory bracket includes an opening into which the intumescent material is disposed.

In at least one configuration of the composite window bracket, the at least one accessory bracket includes a first member and a second member, the first and second members forming a window counterflashing bracket.

The disclosure is also directed to a method of installing a window, the method comprising coupling a first surface of a first member of a composite window bracket to a support beam, and disposing a window on a first surface of a second member of the composite window bracket, the second member of the composite window bracket providing support to the window. The composite window bracket comprises the first member including a first end, a second end, the first surface of the first member extending from the first end of the first member to the second end of the first member, and a second surface extending from the first end of the first member to the second end of the first member, and further comprises the second member including a first end, a second end, a first surface extending from the first end of the second member to the second end of the second member, and a second surface extending from the first end of the second member to the second end of the second member. At least one of the first member and the second member further includes an accessory member to couple the composite window bracket to an accessory bracket.

In at least one configuration of the method, the composite window bracket of the method is comprised of resin and fibers, the fibers comprise at least one of glass fibers, carbon fibers, cellulose fibers, nylon fibers, and aramid fibers.

In at least one configuration of the method, the accessory member of the method is coupled to the second surface of the first member, the accessory member being disposed substantially equidistant between the first end and the second end of the first member, the method further comprising coupling the accessory bracket to the accessory member to couple the composite window bracket to the support beam.

In at least one configuration of the method, the accessory member of the method is coupled to the second surface of the second member, the accessory member being disposed substantially equidistant between the first end and the second end of the second member, the method further comprising coupling the accessory bracket to the accessory member to provide further support for the window.

In at least one configuration of the method, the accessory member of the method forms a slot between the accessory member and the second member, the slot including a substantially planar back surface that is substantially perpendicular to the second surface of the second member and including angled ends such that the slot tapers from the back surface to an opening of the slot, the method further comprising coupling the composite window bracket to the at least one accessory bracket via the slot.

In at least one configuration of the method, the at least one accessory bracket of the method includes a first member and a second member, the first and second members forming a window counterflashing bracket.

In at least one configuration of the method, the at least one accessory bracket of the method includes an opening into which an intumescent material is disposed.

BRIEF DESCRIPTION OF THE DRAWINGS

The disclosure will now be described with reference to the drawings wherein.

Figure 2:
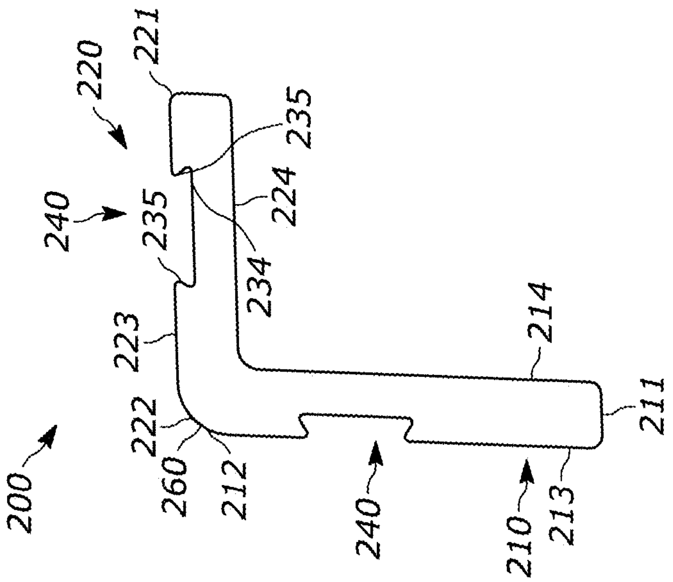
FIG. 2 illustrates a profile view of an example accessory bracket for use with the composite window bracket illustrated in FIG. 1, in accordance with at least one configuration.

1 with the window disposed atop the composite window bracket, in accordance with at least one configuration.

DETAILED DESCRIPTION OF THE DISCLOSURE

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
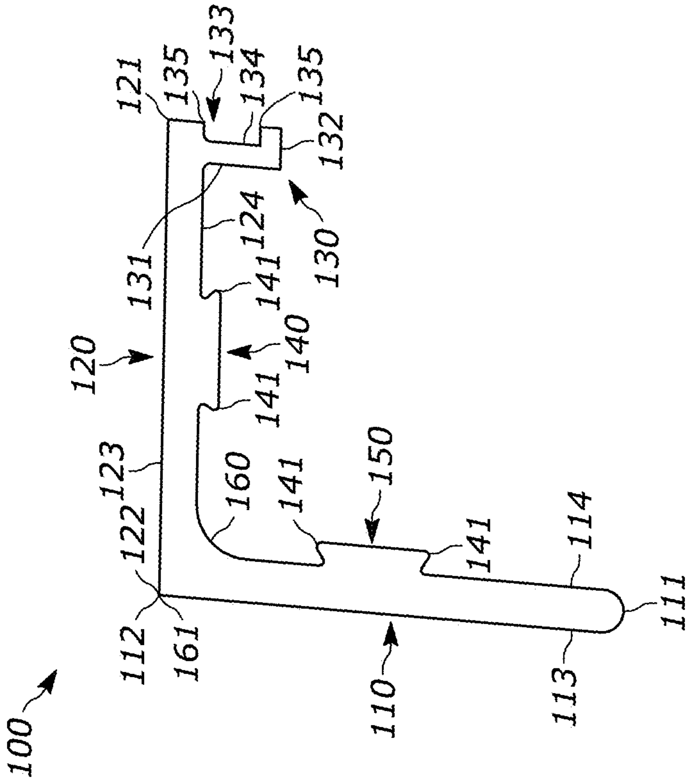
FIG. 1 illustrates a profile view of an example composite window bracket, in accordance with at least one configuration.

Referring now to the drawings and in particular to FIG. 1, a bracket is disclosed, such as a composite window bracket 100. The composite window bracket 100 includes a first member 110 and a second member 120. The first member 110 includes a first end 111 and a second end 112, the first end 111 and the second end 112 being on opposite ends of the first member 110. The first member 110 further includes a first surface 113 extending from the first end 111 to the second end 112, and a second surface 114 extending from the first end 111 to the second end 112. As shown, the first surface 113 is on an opposite side of the first member 110 as the second surface 114. In at least one embodiment the first end 111 can be rounded, as shown.

The second member 120 includes a first end 121 and a second end 122, the first end 121 and the second end 122 being on opposite ends of the second member 120. The second member 120 further includes a first surface 123 extending from the first end 121 to the second end 122, and a second surface 124 extending from the first end 121 to the second end 122. As shown, the first surface 123 is on an opposite side of the second member 120 as the second surface 124. In at least one configuration of the composite window bracket 100, the first surface 123 is approximately 2 inches in width.

In at least one configuration, where the second surface 114 of the first member 110 meets the second surface 124 of the second member 120 can be rounded thereby forming a rounded inside corner 160 for the composite window bracket 100. Such a rounded inside corner 160 increases a rigidity of the composite window bracket 100 with added material from which the composite window bracket 100 is manufactured being included in the rounded inside corner 160. In at least one configuration, where the first surface 113 of the first member 110 meets the first surface 123 of the second member 120 can be squared thereby forming a square outside corner 161 for the composite window bracket 100. The square outside corner 161 also increasing a rigidity of the composite window bracket 100 with added material from which the composite window bracket 100 is manufactured. Such a squared outside corner 161 allows the second end 112 of the first member 110 to sit flush against a support beam 1510 (FIGS. 15 and 16), thereby also along an entire length of the first surface 113 of the first member 110.

At least one of the first member 110 and the second member 120 further includes at least one accessory member coupled thereto to couple the composite window bracket 100 to at least one accessory bracket. Although the accessory member can take on various configurations, FIG. 1 shows an example configuration for the accessory member, shown as accessory member 140. The accessory member 140 is coupled to the second surface 124 of the second member 120. The accessory member 140 is disposed substantially equidistant between the first end 121 and the second end 122 of the second member 120, although other locations are possible. In at least one configuration, an accessory bracket 200 shown in FIG. 2 can be coupled to the accessory member 140 to provide further support for the window 1520.

In at least one configuration, the composite window bracket 100 further includes another accessory member, such as a second accessory member 150. The accessory member 150 is substantially of a same configuration as the accessory member 140. The accessory member 150 can be coupled to the second surface 114 of the first member 110. The accessory member 150 can be disposed substantially equidistant between the first end 111 and the second end 112 of the first member 110, although other locations are possible.

In at least one configuration, the composite window bracket 100 can further include another accessory member, such as accessory member 130. The accessory member 130 is coupled proximate to the first end 121 of the second member 120. As will be discussed in more detail below, the accessory member 130 can be coupled to at least one of a fire suppression bracket, a rigidity bracket, a window retention bracket, or any other bracket, various example configurations of which are discussed below.

In at least one configuration, the accessory member 130 can be "L" shaped and include a first portion 131 that is substantially perpendicularly coupled to the second surface 124 of the second member 120, proximate to buy not fully at the first end 121 of the second member 120. The accessory member 130 can further include a second portion 132 substantially perpendicularly coupled to an opposite end of the first portion 131 from which the first portion 131 is coupled to the second surface 124 of the second member 120, the second portion 132 extending in a same direction as the first end 121 of the second member 132. The first end 121 of the second member 120 and the second portion 132 of the accessory member 130 thereby form a slot 133 therebetween, the slot 133 including a substantially planar back surface 134 that is substantially perpendicular to the second surface 124 of the second member 120. The slot 133 includes angled ends 135 such that the slot 133 tapers from the back surface 134 to an opening of the slot 133, as shown.

In at least one configuration, an accessory member can be coupled to the second member 120, such as the accessory member 140. The accessory member 140 is coupled to the second surface 124 of the second member 120. The accessory member 140 is disposed substantially equidistant between the first end 121 and the second end 122 of the second member 120, although other locations are possible. In at least one configuration, the accessory member 140 can be a tab that is approximately a third of the width of the second member 120. The accessory member 140 is a substantially flat member that includes angled ends 141 that taper towards the second surface 124 where the accessory member 140 couples to the second member 120. In at least one configuration, the composite window bracket 100 can further include another accessory member 150, instead being coupled substantially centrally to the second surface 114 of the first member 110.

Typically, the composite window bracket 100 and a bracket 1540 (FIGS. 15-17) are made from a resin and fiber pultruded member (also known in the construction industry as a "girt") that is cut to size to form the composite window bracket 100 and a bracket 1540, to which the one or more of the accessory brackets 200-1300 disclosed herein are coupled. Such girts may be provided in any number of standard sizes that may be from only a couple of feet long to spans that are forty to fifty feet long. It is most preferred that the composite window bracket 100 and the bracket 1540 comprise a pultruded profile that includes both stranded members and woven members within a resin matrix. It will be understood that the shape can be formed through one or more pultrusion dies to achieve the final desired configuration. It is contemplated that a single resin system may be utilized, or that multiple resin systems may be utilized. Of course, the particular configuration and application may dictate changes to the relative thicknesses and dimensions of the different components. Among other fibers, it is contemplated that the fibers may comprise glass fibers (fiberglass), carbon fibers, cellulose fibers, nylon fibers, aramid fibers, and other such reinforcing fibers.

The composite window bracket 100 and the bracket 1540 provide a thermal break. As used herein, the term "thermal break" refers to a break in like materials wherein the material disposed between like materials is comprised of a material having low thermal conductivity such as a polymeric material having a high R-value as further described below. R-values are measurements of the thermal resistance of different materials. R-values are well known by those skilled in the art of the construction and insulation industries. A high R-value indicates a highly insulative material, such as an R-value of R.2 per inch and higher. Conductive materials have a very low R-value, such as steel which exhibits a negligible or nearly non-existent R-value. In the configuration of the present disclosure, there are no like materials in contact with one another, nor is there any metal to metal contact creating a pathway for heat to transfer from the exterior to the interior and vice versa.

It is also contemplated that the composite window bracket 100 and a bracket 1540 can comprise anticorrosive polymeric materials that exhibit high insulative qualities or rather, demonstrate high R-value properties such as an R-value in the range of about R.2 to about R8 per inch. Polymeric materials suitable for the present disclosure include thermoplastics or thermoset resin materials including for example: acrylonitrile-butadiene-styrene (ABS) copolymers, vinylesters epoxies, phenolic resins, polyvinyl chlorides (PVC), polyesters, polyurethanes, polyphenylsufone resin, polyarylsulfones, polyphthalimide, polyamides, aliphatic polyketones, acrylics, polyxylenes, polypropylenes, polycarbonates, polyphthalam ides, polystyrenes, polyphenylsulfones, polyethersulfones, polyfluorocarbons, bio-resins and blends thereof. Other such thermoplastics and thermoplastic resins suitable for the present disclosure are known in the art which demonstrate high R-values and are thereby heat resistant as well as anticorrosive.

Thermoplastics of the present disclosure are also contemplated using a recyclable polymer or are made of a polymeric material which is partially comprised of a renewable resource such as vegetable oil or the like in its composition when an eco-friendly or "green" composite window bracket 100 and the bracket 1540 are desired. The polymeric material of the present disclosure can also be reinforced with a reinforcing fiber as detailed herein. The composite window bracket 100 and the bracket 1540 composed of the materials discussed above form a thermal break between exterior panels and building substrates (e.g., a support beam 1510) in an effort to control the temperature within a building structure by reducing or eliminating thermal conductivity from the exterior panel to the building substrate and vice versa. In assembly, the R-value of an exterior wall panel system of the present disclosure can typically exhibit a R-value from about R.2 to about R30 per inch depending on the thickness of the overall system, the insulation materials used and the composition of an insulation 1545 (FIGS. 15 and 16), the composite window bracket 100, and the bracket 1540. Further, microspheres, such as polymeric or glass nanospheres, can be added to the makeup of the composite window bracket 100 to provide further insulative properties and increased R-value expression.

Regarding the R-value of the composite window bracket 100 and the bracket 1540 of the present disclosure, a relatively high R-value is desired to ensure adequate insulation of a building structure from outside elements by making the composite window bracket 100 and the bracket 1540 create a thermal break in a wall system. A range of R-values for the polymeric materials used to construct the composite window bracket 100 described above would be a range of about R.2 to about R8 per inch in order to create a thermal break that effectively reduces or eliminates thermal bridging. The thermal conductivity, or K-value, is the reciprocal of the material's R-value, such that for a polymeric material exhibiting an R-value of about R.2 to R8 per inch, the correlating K-value for that material would be from about K5 to about K0.125 per inch. Thus, in comparison to present day metal components used in other insulation systems made of iron or steel, a polymeric bracket member of the present disclosure will exhibit a K-value of approximately about K.5 to about K0.125 per inch at a given set of conditions as compared to components made from a metallic material such as iron or steel which would have an approximate K-value as high as K32 to K60 per inch at the same conditions. This is because metallic materials, such as iron and steel, have low or negligible R-values and are well known conductors of heat. Steel is known to have an R-value of about 0.003R per inch. Thus, for example, a steel clip compared to a polymeric bracket of the present disclosure having an R-value of R.55 would be 183 times more thermally conductive.

There are several different types of measurements that relate to a materials ability to insulate, resist, transmit or conduct heat across a material. Particularly, a material's K-value relates to a specific material's thermal conductivity, a material's C-value correlates to the material's thermal conductance, a material's R-value relates to a material's thermal resistance, and a U-value relates to the thermal transmittance of an overall system. In designing a wall, roof or deck bracket and panel system providing adequate insulative properties for a building structure, materials with low K-values and C-values are desired while materials with high R-values are desired. When this set of conditions is met, the overall thermal transmittance, or U-value, of the system is low. Thus, the lower the U-value, the lower the rate heat thermally bridges from one material to another. A building structure having a well-insulated system will have a much lower U-value than an uninsulated or poorly insulated system exhibiting high thermal transmittance.

FIG. 2 shows an example configuration of an accessory bracket, such as accessory bracket 200. The accessory bracket 200 is configured to substantially correspond to a shape of the second surfaces 114, 124 of the first and second members 110, 120, respectively. The accessory bracket 200 includes a first member 210 and a second member 220. The first member 210 includes a first end 211 and a second end 212, the first end 211 and the second end 212 being on opposite ends of the first member 210. The first member 210 further includes a first surface 213 extending from the first end 211 to the second end 212, and a second surface 214 extending from the first end 211 to the second end 212. As shown, the first surface 213 is on an opposite side of the first member 210 as the second surface 214.

The second member 220 likewise includes a first end 221 and a second end 222, the first end 221 and the second end 122 being on opposite ends of the second member 220. The second member 220 further includes a first surface 223 extending from the first end 221 to the second end 222, and a second surface 224 extending from the first end 221 to the second end 222. As shown, the first surface 223 is on an opposite side of the second member 220 as the second surface 224. Each of the first and second members 210, 220 include slots 240, respectively, that are configured to match shape configuration (width, curvatures, planar portions) of the accessory members 140, 150, discussed above, such that the accessory members 140, 150 slide snuggly into the slots 240. That is, the slots 240 are each configured similar to slot 133, although in at least one configuration they can be wider than slot 133, discussed above to include a substantially planar back surface 134 and angled ends 235 that angle opposite angled ends 141 of the accessory members 140. The accessory bracket 200 further includes a rounded outside corner 260 where the second end 212 of the first member 210 and the second end 222 of the second member 220 meet. This rounded outside corner 260 matches a configuration of the rounded inside corner 160 of the composite window bracket 100, to allow these corners 160, 260 to sit flush once coupled.

Figure 3:
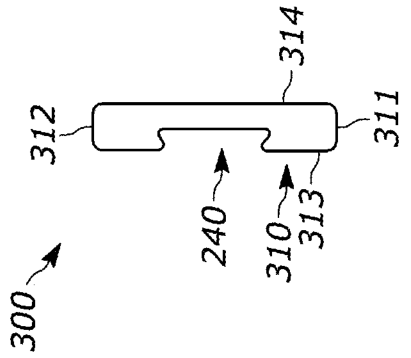
FIG. 3 illustrates a profile view of another example accessory bracket for use with the composite window bracket illustrated in FIG. 1, in accordance with at least one configuration.

FIG. 3 shows another configuration of an accessory bracket, such as accessory bracket 300. The accessory bracket 300 includes a single member, member 300. In this configuration, the accessory bracket 300 includes a first end 311 and a second end 312, the first end 311 and the second end 312 being on opposite ends of the accessory bracket 300. The accessory bracket 300 further includes a first side 313 extending from the first end 311 to the second end 312, and a second side 314 extending from the first end 311 to the second end 312. The first side 313 further includes the slot 240, similar to the accessory bracket 200. In at least one configuration, the accessory bracket 300 is approximately 1.5 inches long from the first end 311 to a second end 312.

Figure 4:
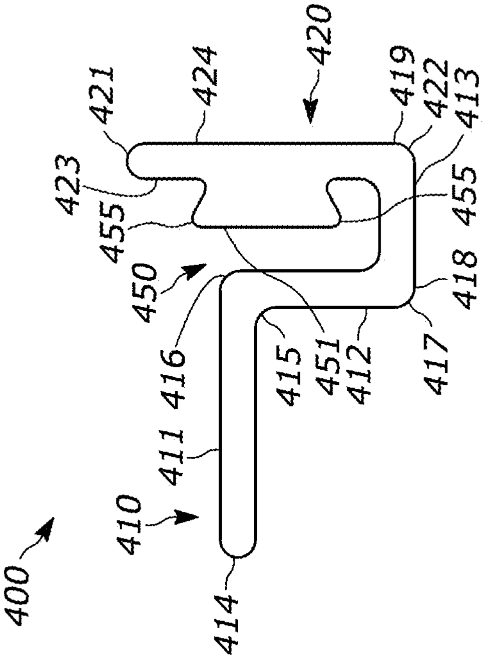
FIG. 4 illustrates a profile view of another example accessory bracket for use with the composite window bracket illustrated in FIG. 1, in accordance with at least one configuration.

FIG. 4 shows even another configuration of an accessory bracket, an endcap bracket such as accessory bracket 400. The accessory bracket 400 includes two members, a first member 410 and a second member 420. The accessory bracket 400 is configured to follow a contour of the accessory member 130 of the composite window bracket 100. In this configuration, the first member 410 is a "Z" shaped member that includes three portions, a first portion 411, a second portion 412, and a third portion 413. The first portion 411 is configured to extend from the accessory member 140 of the composite window bracket 100 to the accessory member 130 of the composite window bracket 100. The first portion 411 includes a first end 414 and a second end 415, the second portion 412 includes a first end 416 and a second end 417, and the third portion 413 includes a first end 418 and a second end 419. The second end 415 of the first portion 411 is substantially perpendicularly coupled to the first end 416 of the second portion 412, and the second end 417 of the second portion 412 is substantially perpendicularly coupled to the first end 418 of the third portion 413. The first, second, and third portions 411, 412, 413 are thin elongated portions that are substantially a same thickness, in at least one configuration.

The second member 420 includes a first end 421, a second end 422, a first side 423 and a second side 424. The second end 419 of the third portion 413 is substantially perpendicularly coupled to the second end 422 of the second member 420. The second member 420 further includes a tab 450, the tab 450 including a substantially flat surface 451 that runs parallel to the second side 424 of the second member 420. The tab 450 also includes angled ends 455 such that ends of the tab 450 taper towards the first side 423, thereby being configured to correspond to the angled ends 123 of the slot 135 of the composite window bracket 100, the tab 450 slidable snuggly into the slot 135.

Figure 5:
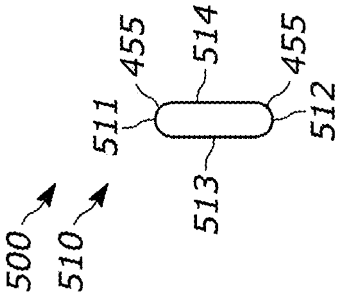
FIG. 5 illustrates a profile view of another example accessory bracket for use with the composite window bracket illustrated in FIG. 1, in accordance with at least one configuration.

FIG. 5 shows even another configuration of an accessory bracket, such as accessory bracket 500. The accessory bracket 500 includes a single member, member 510. The accessory bracket 500 is configured to follow a contour of and fill the slot 133 formed by the accessory member 130 of the composite window bracket 100. The member 510 includes a first end 511, a second end 512, a first side 513, and a second side 514. The member 510 tapers from the first side 513 to the second side 514 such that these tapered ends form the angled ends 455 that match the taper of the slot 133 such that when the member 510 is disposed within, that is slides into, the slot 133 the member 510 substantially entirely fills the slot 133.

Figure 6:
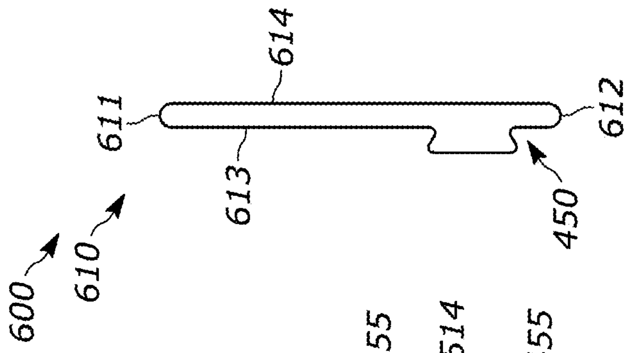
FIG. 6 illustrates a profile view of another example accessory bracket for use with the composite window bracket illustrated in FIG. 1, in accordance with at least one configuration.

FIG. 6 shows even another configuration of an accessory bracket, such as accessory bracket 600. The accessory bracket 600 also includes a single substantially planar member, member 610. The member 610 includes a first end 611, a second end 612, a first side 613, and a second side 614. The member 610 also includes the tab 450 disposed on the first side 613 of the member 610 and proximate to the second end 612 of the member 610. During use of the accessory bracket 600, the first end 611 would being disposed toward the first end 111 of the composite window bracket 100.

Figure 7:
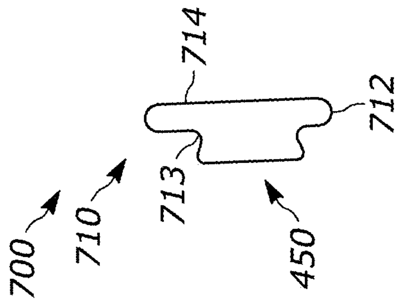
FIG. 7 illustrates a profile view of another example accessory bracket for use with the composite window bracket illustrated in FIG. 1, in accordance with at least one configuration.

FIG. 7 shows yet another configuration of an accessory bracket, such as accessory bracket 700. The accessory bracket 700 also includes a single substantially planar member, member 710, similar to member 610 but shorter in length. The member 710 includes a first end 711, a second end 712, a first side 713, and a second side 714. The member 710 also includes the tab 450 disposed on the first side 713 of the member 710, with the tab 450 in at least one configuration being slightly closer to the second end 712 than the first end 711, as shown.

Figure 8:
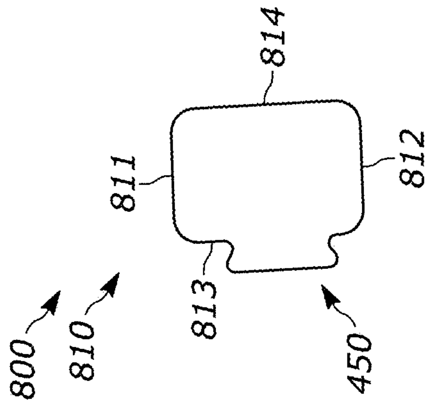
FIG. 8 illustrates a profile view of another example accessory bracket for use with the composite window bracket illustrated in FIG. 1, in accordance with at least one configuration.

FIG. 8 shows even yet another configuration of an accessory bracket, such as accessory bracket 800. The accessory bracket 800 also includes a single member, member 810. The member 810 includes a first end 811, a second end 812, a first side 813, and a second side 814. The member 810 is similar to member 710 but being wider than the member 710 from the first side 813 to the second side 814, forming a rectangular member. The member 810 also includes the tab 450 disposed on the first side 813 of the member 810, the tab 450 being disposed slightly farther from the first end 811 than the second end 812.

Figure 9:
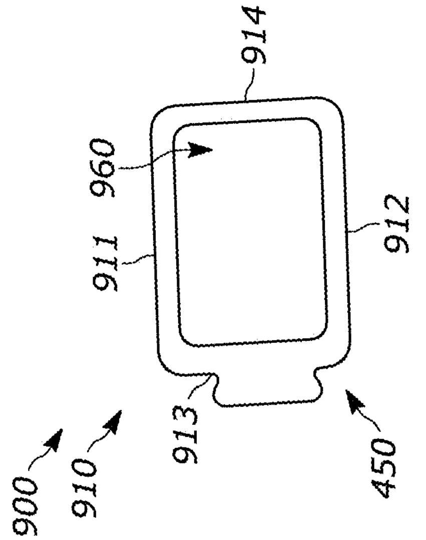
FIG. 9 illustrates a profile view of another example accessory bracket for use with the composite window bracket illustrated in FIG. 1, in accordance with at least one configuration.

FIG. 9 shows yet another configuration of an accessory bracket, such as accessory bracket 900. The accessory bracket 900 includes a member 910. The member 910 includes a first end 911, a second end 912, a first side 913, and a second side 914. The member 910 is similar to member 810 but being wider than the member 810 from the first side 913 to the second side 914. The member 910 also includes the tab 450 disposed on the first side 913 of the member 910, the tab 450 being disposed slightly farther from the first end 911 than the second end 912. The member 910 further includes an opening, an opening 960 sized such that the opening 960 forms thin walls between the opening 960 and the first and second ends, 911, 912 and the first and second sides 913, 914.

Figure 10:
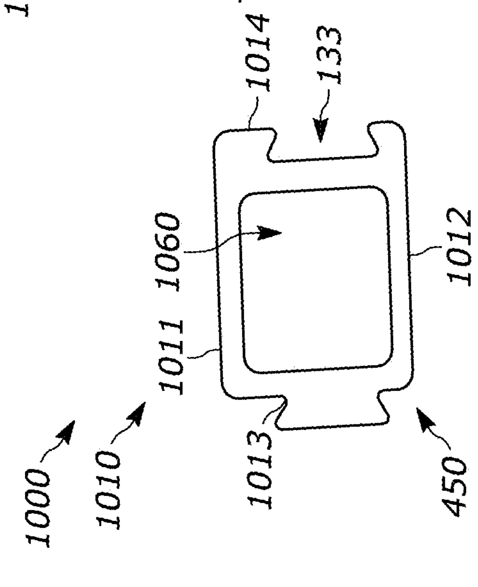
FIG. 10 illustrates a profile view of another example accessory bracket for use with the composite window bracket illustrated in FIG. 1, in accordance with at least one configuration.

FIG. 10 shows another configuration of an accessory bracket, such as accessory bracket 1000. The accessory bracket 1000 includes a member 1010. The member 1010 includes a first end 1011, a second end 1012, a first side 1013, and a second side 1014. The member 1010 is similar to member 910 being substantially a same width from the first side 913 to the second side 914. The member 1010 also includes the tab 450 disposed on the first side 1013 of the member 1010, the tab 450 being disposed slightly farther from the first end 1011 than the second end 1012. The member 1010 further includes an opening, an opening 1060 sized such that the opening 1060 forms thin walls between the opening 1060 and the first and second ends, 1011, 1012 and the first and second sides 1013, 1014, similar to opening 960. In this configuration, the opening 1060 is slightly smaller than opening 960. The member 1010 further includes the slot 133 disposed on the second side 1014 and disposed slightly farther from the first end 1011 than the second end 1012, in-line with the tab 450. Thus, since member 1010 includes the same slot 133 as the composite window bracket 100, any accessory brackets disclosed herein can also be similar coupled to the accessory bracket 1000.

Figure 11:
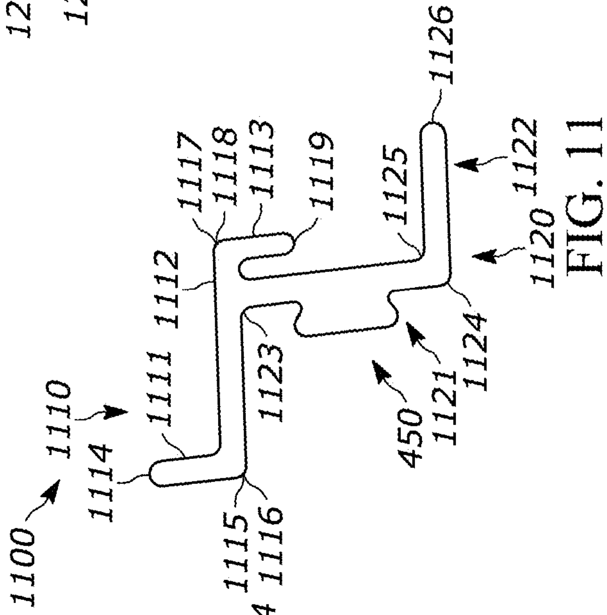
FIG. 11 illustrates a profile view of another example accessory bracket for use with the composite window bracket illustrated in FIG. 1, in accordance with at least one configuration.

FIG. 11 shows even another configuration of an accessory bracket, a window counterflashing bracket such as accessory bracket 1100. The accessory bracket 1100 includes two members, a first member 1110 and a second member 1120. The accessory bracket 1100 is configured to follow a contour of the accessory member 130 of the composite window bracket 100. In this configuration, the first member 1110 is a "Z" shaped member that includes three portions, a first portion 1111, a second portion 1112, and a third portion 1113. The first portion 1111 is configured to extend substantially perpendicular to the first surface 123 of the composite window bracket 100. The first portion 1111 includes a first end 1114 and a second end 1115, the second portion 1112 includes a first end 1116 and a second end 1117, and the third portion 1113 includes a first end 1118 and a second end 1119. The second end 1115 of the first portion 1111 is substantially perpendicularly coupled to the first end 1116 of the second portion 1112, and the second end 1117 of the second portion 1112 is substantially perpendicularly coupled to the first end 1118 of the third portion 1113. The first, second, and third portions 1111, 1112, 1113 are thin elongated portions that are substantially a same thickness, in at least one configuration.

The second member 1120 is an "L" shaped member that includes a first portion 1121 and a second portion 1122. The first portion 1121 includes a first end 1123 and a second end 1124. The first portion 1121 is coupled to the second portion 1112 of the first member 1110 and proximate to the second end 1117 of the first member 1110. The second portion 1122 includes a first end 1125 and a second end 1126 that is substantially perpendicularly coupled to the second end 1124 of the first portion 1121. The first portion 1121 further includes the tab 450 coupled substantially centrally on a side of the first portion 1121 facing the first portion 1111, as shown. When the accessory bracket 1100 is installed onto the composite window bracket 100, the first portion 1111 is disposed within a recess or slot in a frame of the window 1520 to secure the window 1520 to the accessory bracket 1100.

Figure 12:
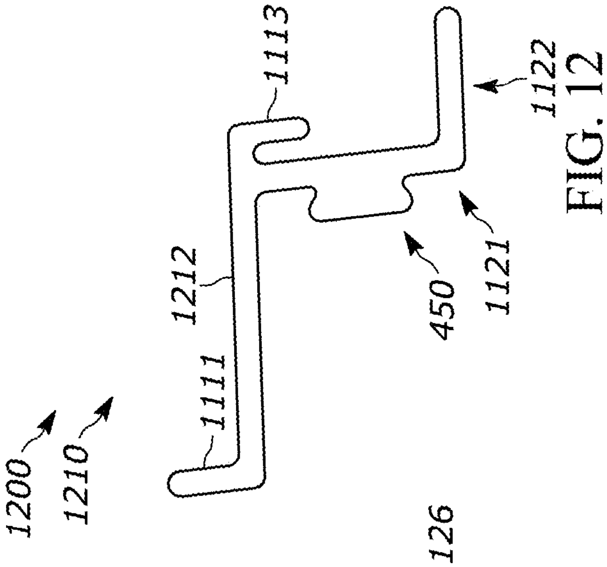
FIG. 12 illustrates a profile view of another example accessory bracket for use with the composite window bracket illustrated in FIG. 1, in accordance with at least one configuration.

FIG. 12 shows another window counterflashing bracket, accessory bracket 1100 similar to the accessory bracket 1100 but including another second member 1210 being substantially the same as the second member 1100 but having a longer second portion, second portion 1212. Similar to the accessory bracket 1100, when the accessory bracket 1200 is installed onto the composite window bracket 100 the first portion 1111 is again disposed within a frame of the window 1520 to secure the window 1520 to the accessory bracket 1100. However, because the second portion 1212 is longer that the second portion 1112 of the accessory bracket 1100, the first portion 1111 is positioned closer to the second end 122 of the second member 120 of the composite window bracket 100 thereby positioning the window 1520 closer to the second end 122 of the second member 120 of the composite window bracket 100.

During installation of the composite window bracket 100, the first surface 113 of the first member 110 is to be coupled to the support beam 1510. That is, the composite window bracket 100 is aligned with an opening (not shown) in which the window 1520 is to be disposed. The first surface 123 of the composite window bracket 100 is aligned with this opening such that the first surface 123 and the opening form a substantially horizontal planar surface, such as that shown in FIGS. 15, 16. Then, at least one fastener, such as fastener 1530 (e.g., screws), is used to secure the composite window bracket 100 to the support beam 1510. Thereafter, the window 1520 is disposed on the composite window bracket 100. The window 1520 is disposed on the first surface 123 of the second member 120 that provides support to the window 1520. Thereafter, at least one fastener (not shown), such as at least one screw, can be used to secure the window 1520 to the composite window bracket 100.

During installation of any of the accessory brackets 200-1200, the accessory brackets 200-1200 are slid onto either ends 1711, 1712 (FIG. 17) of the composite window brackets 100, 1400 or the accessory bracket 1000. The accessory brackets 200-1200 and the accessory members 140, 150 and/or the slot 133 mate to secure the accessory brackets 200-1200 onto either the accessory members 140, 150 and/or the slot 133. Thereafter, at least one of the fastener 1530 can be disposed through both the accessory brackets 200-1200 and the composite window brackets 100, 1400 to secure the accessory brackets 200-1200 to the composite window brackets 100, 1400.

In at least one configuration, the accessory brackets 200-1200 and an accessory bracket 1300 (FIG. 13) can include metal, such as aluminum or steel, an intumescent material, such as soft or hard char, Fiberglass Reinforced Panels (FRP), Polyvinyl Chloride (PVC), and/or a combination of these materials. In at least one configuration, the accessory brackets 200-600, 1300 can be metal, the accessory brackets 700, 800 can be an intumescent loaded material, such as FRP, and the accessory brackets 1100, 1200 can be one of metal, FRP, and PVC. In at least one configuration, the accessory brackets 900, 1000 can include an intumescent material disposed within the openings 960, 1060, respectively.

Figure 13:
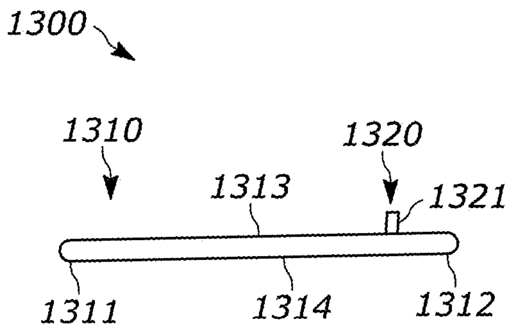
FIG. 13 illustrates a profile view of another example accessory bracket for use with a composite window bracket illustrated in FIG. 14, in accordance with at least one configuration.

FIG. 13 illustrates another type of accessory bracket, the accessory bracket 1300. This accessory bracket 1300 includes two members, a first member 1310 that is an elongated planar member that is configured to extend under a composite window bracket, such as a composite window attachment 1400 bracket shown in FIG. 14, and on an end of the support beam 1510. The first member 1310 includes a first end 1311 and a second end 1312, the first end 1311 and the second end 1312 being on opposite ends of the first member 1310. The first member 1310 further includes a first surface 1313 extending from the first end 1311 to the second end 1312, and a second surface 1314 extending from the first end 1311 to the second end 1312. As shown, the first surface 1313 is on an opposite side of the first member 1310 as the second surface 1314. The accessory bracket 1300 also includes a second member 1320 that is a nub 1321 that is a small protrusion and disposed perpendicular to the first surface 1313 and proximate to the second end 1312. Although not shown, the accessory bracket 1300 can be various widths, such that the accessory bracket 1300 can made nearly a same width as a composite window bracket 1400 (FIG. 14), or alternatively can be made much smaller such that a plurality of the accessory bracket 1300 can be used with a single composite window bracket 1400.

Figure 14:
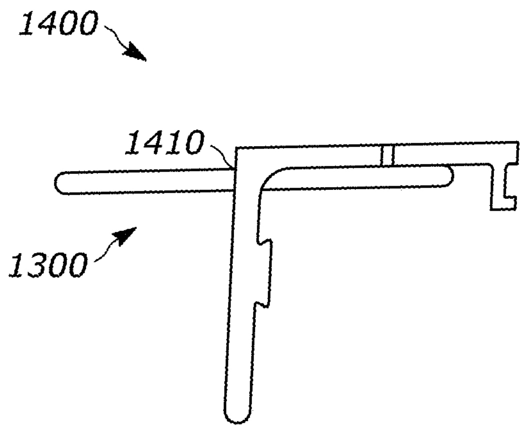
FIG. 14 illustrates a profile view of another example composite window bracket for use with the accessory bracket illustrated in FIG. 13, in accordance with at least one configuration.

FIG. 14 illustrates another type of composite window bracket, the composite window bracket 1400. The composite window bracket 1400 is the similar to the composite window bracket 100, but lacking the accessory member 140 but instead including an opening 1410 that extends thru the first member 110. The opening 1410 is disposed where the first member 110 and the second member 120 meet, such that during installation of the accessory bracket 1300 the accessory bracket 1300 is disposed thru the opening 1410. When such disposed, a portion of the accessory bracket 1300 is disposed atop the support beam 1510 and another portion of the accessory bracket 1300 is disposed against the second surface 124. The accessory bracket 1300 can then be secured to both the support beam 1510 and the composite window bracket 1400 via at least one fastener. With this configuration, the accessory bracket 1300 provides additional support to the window 1520 when the window 1520 is disposed atop the composite window bracket 1400.

Figure 15:
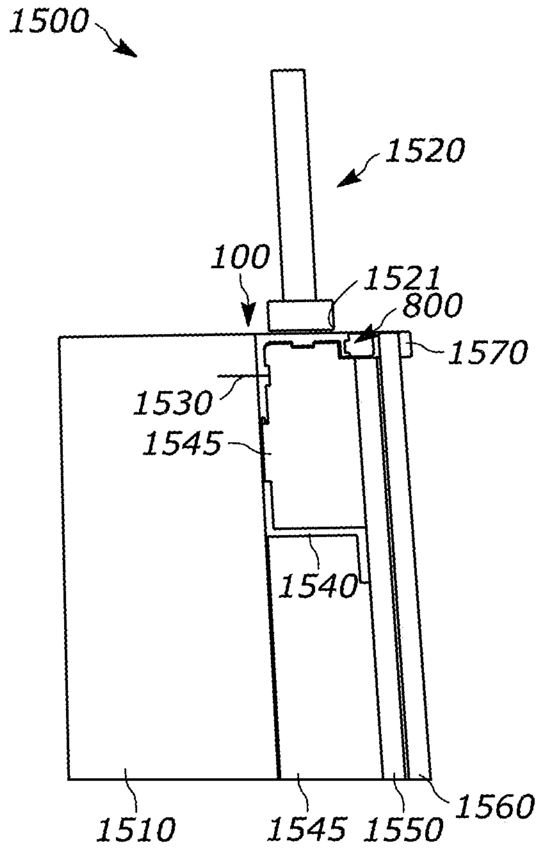
FIG. 15 illustrates a profile view of an example system including the composite window bracket illustrated in FIG. 1 with a window disposed atop the composite window bracket and the accessory bracket illustrated in FIG. 8, in accordance with at least one configuration.
Figure 16:
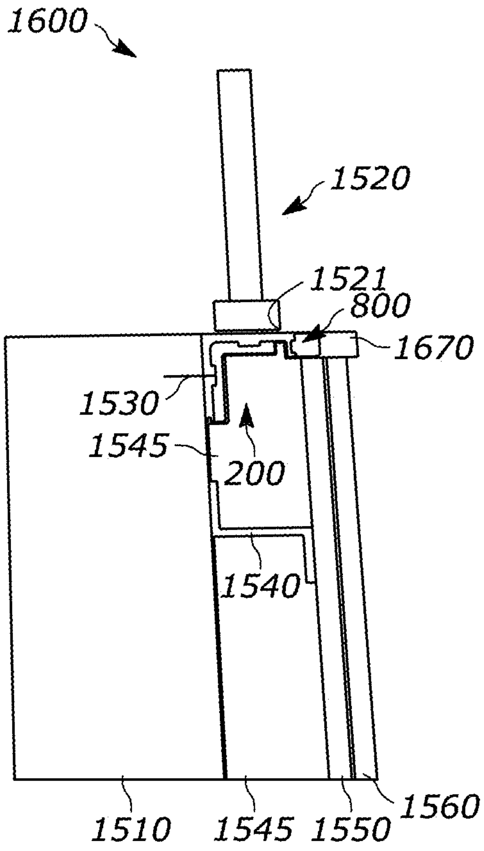
FIG. 16 illustrates a profile view of another example system including the composite window bracket illustrated in FIG. 1, the accessory bracket illustrated in FIG. 2, and the accessory bracket illustrated in FIG. 8, in accordance with at least one configuration.
Figure 17:
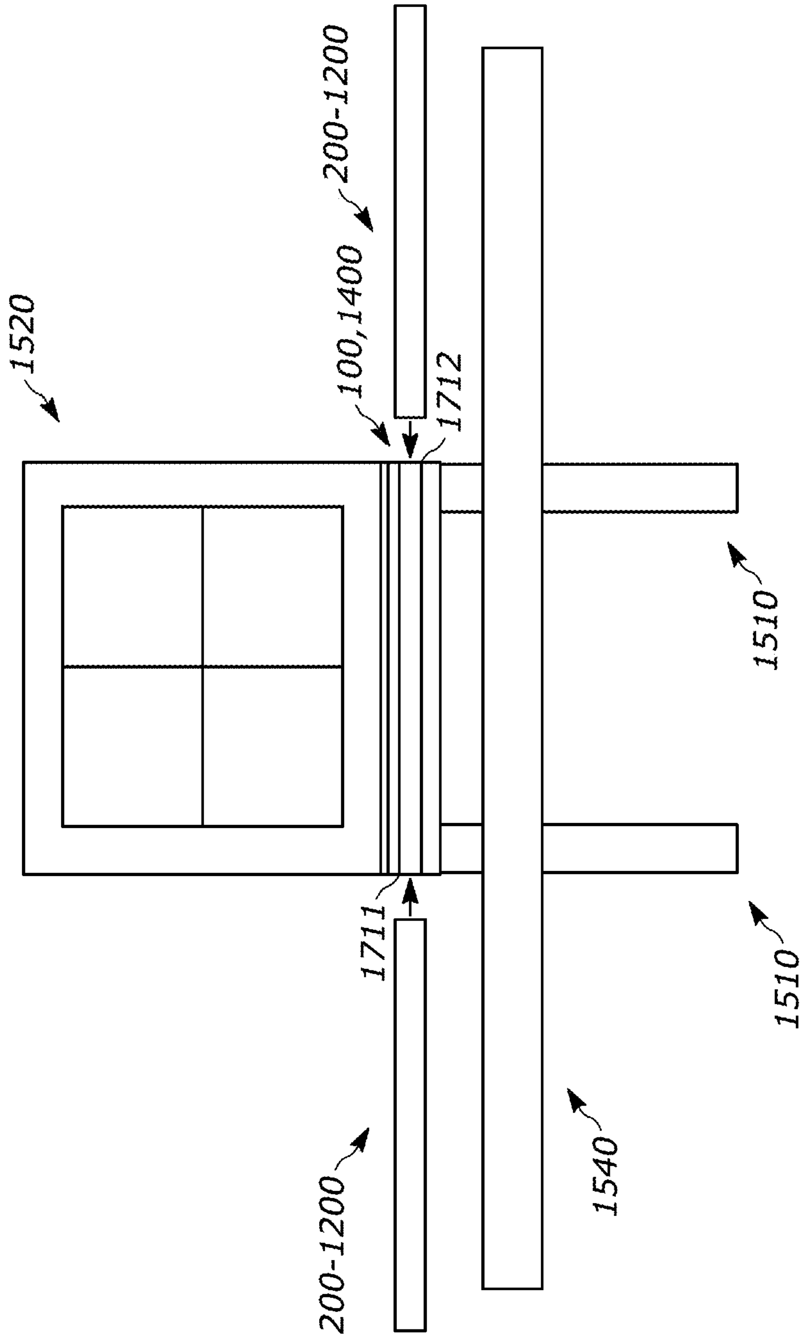
FIG. 17 illustrates a front view of another example system including the composite window bracket illustrated in FIG.

FIGS. 15 and 16 illustrate two systems 1500, 1600, respectively, that utilize the composite window bracket 100 discussed above. The system 1500 includes the composite window bracket 100 coupled to the support beam 1510, together forming a substantially planar surface. Also coupled to the support beam 1510 is another type of bracket or "girt", shown as bracket 1540. Disposed on both sides of the bracket 1540 is the insulation 1545, such as that typically used in building construction. Coupled to the bracket 1540 are one or more claddings, such as claddings 1550, 1560. These claddings 1550, 1560 can include additional insulation and a building siding (e.g., corrugated metal siding, vinyl siding, or any other type of siding).

In more detail, the insulation 1545 can also be fire retardant panels, sound dampening panels or any other type of insulating material or panel known in the art for providing an interior or exterior wall with a quality for which the panel is known. Other such insulating materials or panels include materials having additives like insecticides, fungicides or colorants for example, though many types of insulating materials are known in the art. For the purposes of the description below, as depicted in the accompanying figures, they are exemplified as panels, which may be sealed or unsealed, designed to insulate the building structure. Sealed panels provide a vapor barrier in the wall construction of the present disclosure. Other insulating materials suitable for use with the insulation 1545 include, but not be limited to, foam, fiberglass insulation, rigid insulation, semi rigid insulation, blanket insulation, loose fill insulation, spray foam in either fiberglass, rock wool, cellulose based, polystyrene, polyisocyanurate, polyurethane or other polymeric insulation formulations.

As an example configuration, system 1500 includes the accessory bracket 800 disposed within the slot 133 of the composite window bracket 100. As shown, the cladding 1550 can be disposed under the accessory bracket 800 and the cladding 1560 can be disposed against the second side 814 of the accessory bracket 800. To assist with securing the cladding 1560 against the cladding 1550, another type of bracket, bracket 1570 can be disposed atop the cladding 1560, atop the accessory bracket 800, atop the first end 121 of the composite window bracket 100, and into a slot 1521 within the window 1520.

In another configuration illustrated in FIG. 16, the system 1600 further includes the accessory bracket 200 coupled to the composite window bracket 100 via mating of the accessory members 140 of the composite window bracket 100 and the slots 240, 250 of the accessory bracket 240, respectively. As shown, the accessory bracket 200 is disposed below the window 1520 thereby providing support to the window 1520. The system 1600 is shown as using another type of bracket, bracket 1670 that can be disposed atop the cladding 1560, atop the accessory bracket 800, atop the first end 121 of the composite window bracket 100, and into the slot 1521 within the window 1520. Instead of an end of the cladding 1560 being disposed within the bracket 1570, as shown in FIG. 15, an end of the cladding 1560 abuts the bracket 1670, as shown in FIG. 16.

Features disclosed herein as being substantially configured can vary (e.g., +−10%), without departing from the scope of this disclosure. The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A composite window bracket comprising:

a first member including a first end, a second end, a first surface extending from the first end of the first member to the second end of the first member, and a second surface extending from the first end of the first member to the second end of the first member, the first surface of the first member attachable to a support beam; and a second member including a first end, a second end, a first surface extending from the first end of the second member to the second end of the second member, meeting the first surface of the first member, and a second surface extending from the first end of the second member to the second end of the second member, meeting the second surface of the first member;

a third accessory member positioned proximate the first end of the second member, the third accessory member forms an outwardly opening slot facing away from the first member, between the accessory member and the second member, and adapted to receive a second accessory bracket within the slot thereof, wherein the composite window bracket comprises a plurality of fibers within a resin matrix.

2. The composite window bracket of claim 1 wherein the outwardly opening slot includes a back surface and opposing angled ends such that the outward opening slot tapers from the back surface to the outwardly opening slot.

3. The composite window bracket of claim 2 wherein the slot has a substantially uniform cross-sectional configuration along a width of the composite window bracket.

4. The composite window bracket of claim 2 wherein the back surface of the slot is substantially perpendicular to the second surface of the second member.

5. The composite window bracket of claim 3 wherein the first member and the second member are substantially parallel to each other.

6. The composite window bracket of claim 2 wherein the opposing angled ends terminate at the first end of the second member.

7. The composite window bracket of claim 1 further comprising a first accessory member, the first accessory member formed on the second surface of the first member.

8. The composite window bracket of claim 7 wherein the first accessory member extends outwardly from the second surface of the first member, the first accessory member having a substantially uniform cross-sectional configuration along a width of the composite window bracket and further including a pair of opposite angled ends.

9. A composite window bracket comprising:

a first member including a first end, a second end, a first surface extending from the first end of the first member to the second end of the first member, and a second surface extending from the first end of the first member to the second end of the first member, the first surface of the first member attachable to a support beam; and a second member including a first end, a second end, a first surface extending from the first end of the second member to the second end of the second member, meeting the first surface of the first member, and a second surface extending from the first end of the second member to the second end of the second member, meeting the second surface of the first member;

a third accessory member positioned proximate the first end of the second member, the third accessory member forms an outwardly opening slot facing away from the first member, between the accessory member and the second member, and adapted to receive a second accessory bracket within the slot thereof;

a first accessory member, the first accessory member formed on the second surface of the first member, wherein the first accessory member extends outwardly from the second surface of the first member, the first accessory member having a substantially uniform cross-sectional configuration along a width of the composite window bracket and further including a pair of opposite angled ends; and a second accessory member, the second accessory member formed on the second surface of the second member.

10. The composite window bracket of claim 9 wherein:

the first accessory member extends outwardly from the second surface of the first member, the first accessory member having a substantially uniform cross-sectional configuration along a width of the composite window bracket and further including a pair of opposite angled ends; and the second accessory member extends outwardly from the second surface of the second member, the second accessory member having a substantially uniform cross-sectional configuration along a width of the composite window bracket and further including a pair of opposite angled ends.

11. The composite window bracket of claim 10 wherein the first member and the second member are substantially perpendicular to each other.

12. The composite window bracket of claim 9 wherein the composite window bracket comprises a plurality of fibers within a resin matrix.

13. The composite window bracket of claim 1 wherein the composite window bracket is integrally formed.

14. A bracket system comprising:

a composite window bracket including:

a first member including a first end, a second end, a first surface extending from the first end of the first member to the second end of the first member, and a second surface extending from the first end of the first member to the second end of the first member, the first surface of the first member attachable to a support beam; and a second member including a first end, a second end, a first surface extending from the first end of the second member to the second end of the second member, meeting the first surface of the first member, and a second surface extending from the first end of the second member to the second end of the second member, meeting the second surface of the first member;

a third accessory member positioned proximate the first end of the second member, the third accessory member forms an outwardly opening slot facing away from the first member, between the accessory member and the second member, and adapted to receive a second accessory bracket within the slot thereof;

a second accessory bracket attachable to the third accessory member, the second accessory bracket includes a tab, the tab being slidably insertable into the outwardly opening slot of the third accessory member.

15. The bracket system of claim 14 wherein the second accessory bracket further includes a portion that overlies at least a portion of at least one of the first surface of the second member and the second surface of the second member.

16. The bracket system of claim 15 wherein the second accessory bracket overlies a portion of the first surface of the second member.

17. The bracket system of claim 16 wherein the second accessory bracket further includes a portion that extends from a portion of the second accessory bracket that overlies a portion of the first surface of the second member so as to be substantially perpendicular to the first surface of the second member.

18. The bracket system of claim 15 wherein the second accessory bracket overlies a portion of the second surface of the second member, and overlies an outer surface of the third accessory member.

19. The bracket system of claim 14 wherein the second accessory bracket further includes a portion positioned opposite the tab, the portion further including at least one slot and an L shaped member.

20. The bracket system of claim 14 wherein the second accessory bracket further includes a portion positioned opposite the tab, the portion further including an opening extending along a length thereof.

* * * * *